(12) United States Patent
Kallus et al.

(10) Patent No.: US 12,436,525 B2
(45) Date of Patent: Oct. 7, 2025

(54) SENSOR CONTROL SYSTEM FOR CONTROLLING A SENSOR NETWORK

(71) Applicant: Telefonaktiebolaget LM Ericsson (publ), Stockholm (SE)

(72) Inventors: Zsófia Kallus, Budapest (HU); Péter Hága, Budapest (HU); Máté Szebenyei, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 429 days.

(21) Appl. No.: 17/927,231

(22) PCT Filed: May 26, 2020

(86) PCT No.: PCT/IB2020/054987
§ 371 (c)(1),
(2) Date: Nov. 22, 2022

(87) PCT Pub. No.: WO2021/240213
PCT Pub. Date: Dec. 2, 2021

(65) Prior Publication Data
US 2023/0213920 A1    Jul. 6, 2023

(51) Int. Cl.
*G05B 19/418* (2006.01)

(52) U.S. Cl.
CPC ..... *G05B 19/4185* (2013.01); *G05B 19/4183* (2013.01)

(58) Field of Classification Search
CPC .. G05B 19/4185; G05B 19/4183; G06N 7/01; G06N 20/00; G06N 3/006; H04W 24/04; H04W 84/18; H04W 24/02
See application file for complete search history.

(56) References Cited

U.S. PATENT DOCUMENTS

| | | |
|---|---|---|
| 2018/0165603 A1 | 6/2018 | Van Seijen et al. |
| 2019/0279076 A1 | 9/2019 | Hu et al. |
| 2020/0151562 A1 | 5/2020 | Pietquin et al. |
| 2021/0103286 A1* | 4/2021 | Wang ............ G05D 1/0214 |
| 2021/0174203 A1* | 6/2021 | Lee ............... G06N 3/045 |
| 2021/0334592 A1* | 10/2021 | Taniai ............ G06T 7/20 |

FOREIGN PATENT DOCUMENTS

WO    2019/155354 A1    8/2019

OTHER PUBLICATIONS

International Search Report and Written Opinion issued in International Application No. PCT/IB2020/054987 dated Feb. 16, 2021 (9 pages).

(Continued)

*Primary Examiner* — Manuel A Rivera Vargas
(74) *Attorney, Agent, or Firm* — Sonoda & Kobayashi Intellectual Property Law; Sarvajit S. Patil (57) ABSTRACT

A sensor control system (202) for managing at least a first set of one or more sensors (101) for monitoring a first domain of an industrial process and a second set of one or more sensors (102) for monitoring a second domain of the industrial process, wherein the sensor control system (202) comprises at least a first reinforcement learning, RL, agent (A1) and a second RL agent (A2), wherein the first and second RL agents were trained using reinforcement learning and a process graph (196) representing the industrial process.

19 Claims, 7 Drawing Sheets

(56) References Cited

OTHER PUBLICATIONS

OpenAI Five, https://openai.com/blog/openai-five/ Aug. 16, 2020 (18 pages).
Berner, C et al., "Dota 2 with Large Scale Deep Reinforcement Learning", Dec. 13, 2019 (66 pages).
OpenAI Five 2016-2019, https://openai.com/projects/five/ Jun. 10, 2020 (12 pages).

* cited by examiner

SENSOR CONTROL SYSTEM FOR CONTROLLING A SENSOR NETWORK

CROSS REFERENCE TO RELATED APPLICATIONS

This application is a 35 U.S.C. § 371 National Stage of International Patent Application No. PCT/IB2020/054987, filed 2020 May 26.

TECHNICAL FIELD

Disclosed are embodiments related to sensor management.

BACKGROUND

"Industry 4.0" refers to a new phase in the industrial revolution that focuses on automation, machine learning, and real-time data. Industry 4.0, which encompasses Industrial Internet of Things (I-IoT) and smart manufacturing, marries physical production and operations with smart digital technology (e.g., machine learning) to create a more optimized industrial process (e.g., manufacturing process). While every company and organization is different, they all face a common challenge—the need for access to real-time insights.

Industry 4.0 principles used in manufacturing sites are introducing flexible production line design and continuous monitoring of equipment and workers through a network of various sensors. Using the advantages of I-IoT, the control of a production processes can benefit from cloud services relying on the continuous, near real-time monitoring of the relevant physical states at various stages of the production.

Process mining can extract knowledge from event logs recorded by the information systems of the various, heterogeneous input domains. It can range from business processes to strictly manufacturing equipment logs. Its uses can range from discovery of an unknown model, thorough checking conformance between reality and a desired a priori model, or enhancement of an a priori model. If its goal is to improve the control over processes, it can work by discovery of performance-related information. For example, a resulting process graph will identify nodes and links, describing the production flow from the stage of incoming assembly elements to the stage of ready to be shipped assembled products.

Hyperscale IoT can be used to improve upon an industrial control system when introduced to an Industry 4.0 manufacturing site. This will create event logs and sensor measurements of a much higher granularity in all of the input domains, e.g., in mechanical or environmental sensing, both in spatial and temporal dimensions. Such monitoring capabilities can provide the necessary information for efficient process optimization and automation in an industrial site.

Current machine learning (ML) techniques for optimization purposes are widely used in industrial settings from quality assurance to predictive maintenance tasks. Dedicated sensors giving small-scale monitoring enable dedicated automation solutions. Image processing, time series analysis, anomaly detection, etc. are among the range of methods. One example of a highly advanced consumer segment is the gaming industry, where use cases inherently contain direct feedback on performance of a given solution. That is why many state-of-the-art reinforcement learning (RL) methods are developed for these use cases. A recent advancement in this area is the use of a multi-agent hierarchical solution, where the training of the RL agents is divided into two stages: 1) first each RL agent learns its own special domain, and 2) then a coordinated strategic cooperation is introduced in the second phase. This leads to the agents learning when to step back for later reward, reaching significantly better overall results.

SUMMARY

Certain challenges presently exist. For instance, existing sensor control systems do not take into account the necessity of measurements, and, therefore, tend to produce more sensor data than is necessary to optimally operate the industrial process being monitored by the sensors. For example, existing control systems rely on simple periodic report settings and/or threshold/trigger-based reporting, even though such a trigger based or periodic report may not be useful. Furthermore, once hyperscale IoT sensors are introduced, the control system explodes in scale and in complexity. One solution is to divide the control system into sub-domains at the expense of losing the gains of global optimization. The control system can also be configured to rely on fixed rules, but the necessary fine tuning of such rules is costly and sub-optimal, and also requires expert supervision for updates, etc. In such control systems, it is difficult to introduce new functions and explain decisions, and dynamic priority updates are hard to cascade through complex logics and algorithms. Lastly, current control systems do not implement continuously learning automation, where the control system is optimized based on feedback from the process performance metrics.

Accordingly, this disclosure proposes a sensor control system and method to solve the problem of optimization of a hyperscale, heterogeneous sensor network integrated into an industrial process management system. The sensor control system according to the embodiments disclosed herein minimizes monitoring cost without compromising the quality of monitoring functions with regards to the industrial process efficiencies.

Embodiments may include both local and cloud components. And embodiments use RL agents as control functions and defines an optimization for hierarchical goal functions to implement reinforcement learning principles. This implementation is used to efficiently define high-level goals and relative importance of domains in order to train the sensor control system to automatically optimize the sensor reporting settings in various situations. The efficiency of a given strategy will be measured by the process metrics, using a process graph.

In one aspect there is provided a method performed by a sensor control system. The sensor control system is for managing at least a first set of one or more sensors for monitoring a first domain of an industrial process and a second set of one or more sensors for monitoring a second domain of the industrial process. The sensor control system comprises at least a first reinforcement learning, RL, agent and a second RL agent, wherein the first and second RL agents were trained using reinforcement learning and a process graph representing the industrial process. The method includes the sensor control system receiving sensor data from the first set of one or more sensors. The method also includes the sensor control system using the received sensor data and the process graph to decide whether or not to reconfigure the first set of sensors and/or the second set of sensors. The method further includes the sensor control system providing configuration information to the first set of sensors and/or the second set of sensors as a result of the sensor control system deciding to reconfigure the first set of sensors and/or the second set of sensors.

In another aspect there is provided a sensor control system for managing at least a first set of one or more sensors for monitoring a first domain of an industrial process and a second set of one or more sensors for monitoring a second domain of the industrial process. The sensor control system includes a first RL agent and a second RL agent. The first and second RL agents were trained using reinforcement learning and a process graph representing the industrial process. The sensor control system is operable to: i) receive sensor data from the first set of one or more sensors; ii) use the received sensor data and the process graph to decide whether or not to reconfigure the first set of sensors and/or the second set of sensors; and iii) provide configuration information to the first set of sensors and/or the second set of sensors as a result of deciding to reconfigure the first set of sensors and/or the second set of sensors.

Advantages of the embodiments disclosed herein include: 1) closed-loop design of the control of the sensor network and a continuous training loop that can react to both regular and concept-shift-related changes in the functioning of the underlying industrial process; 2) enabling scaling up the variability and volume of the Industrial-IoT system, hence hyperscale I-IoT system management; 3) the RL agents provide interpretable actions, since process stages provide input for performance metrics of the decisions; 4) simple task of high-level goals definition from the operators is satisfied by local, low-level actions leveraging domain-specific agents; this also creates an easy way of setting priorities; 5) the sensor control system can be easily adapted for new factory setups and production line updates and reconfigurations; 6) dynamic configuration of the underlying sensor network increases energy efficiency and decreases unnecessary communication: low-impact sensor measurements are not needed for same level of decision making; and 7) provides an interface to existing, legacy systems.

BRIEF DESCRIPTION OF THE DRAWINGS

The accompanying drawings, which are incorporated herein and form part of the specification, illustrate various embodiments.

DETAILED DESCRIPTION

Figure 1:
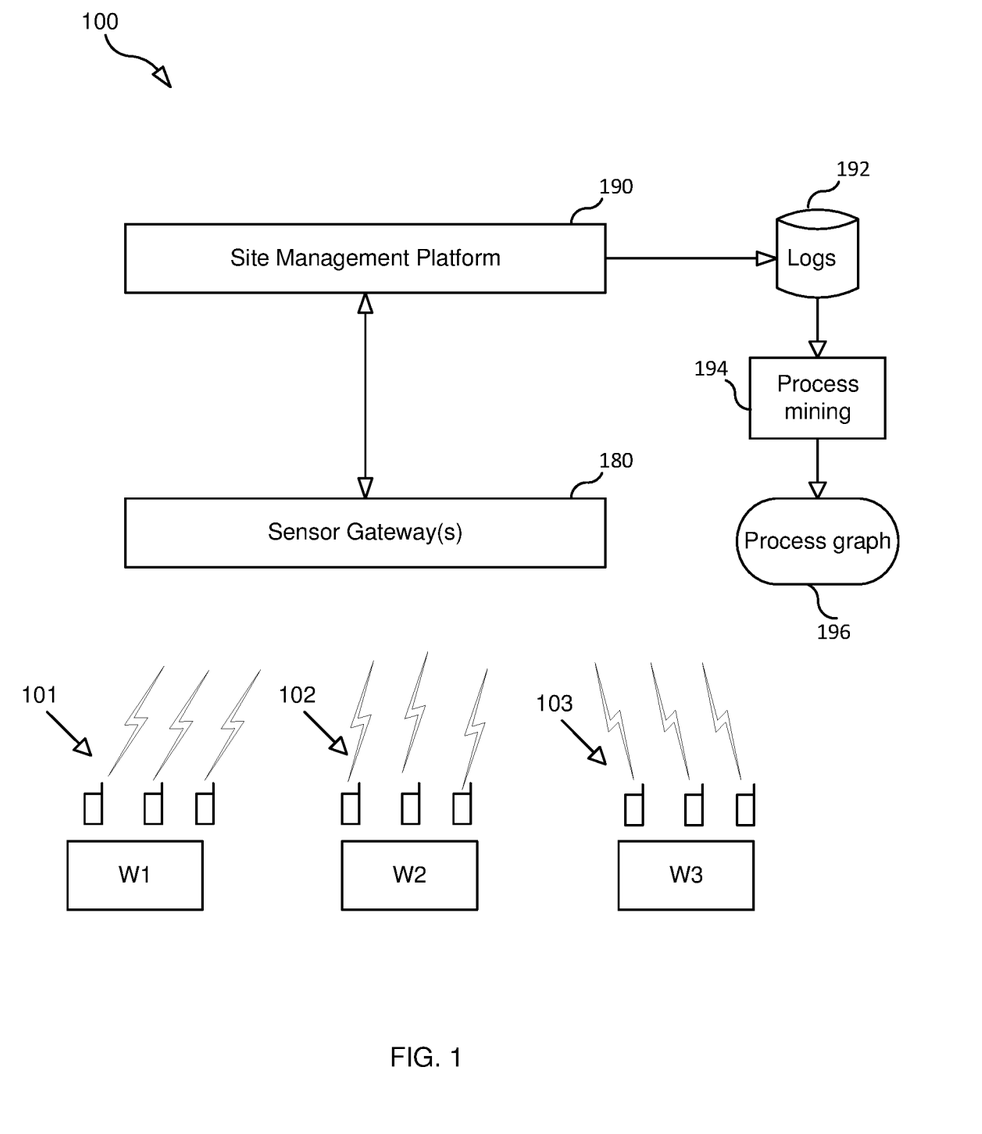
FIG. 1 illustrate a system that employs a network of sensors to monitor an industrial process.

FIG. 1 illustrates a system 100 that employs a network of sensors to monitor an industrial process. In this example, the network of sensors (e.g., a hyperscale sensor system) comprises a first set of one or more sensors 101 for monitoring a first "workstation" W1, a second set of one or more sensors 102 for monitoring a second workstation W2, and a third set of one or more sensors 103 for monitoring a third workstation W3. The sensors illustrated, in the example, wirelessly communicate their reports (measurements) to the site management system 190 via a set of one or more sensor gateways 180. Of course, this disclosure is not limited to any specific number of sensors or workstations, and the term workstation is intended to be interpreted broadly to mean any entity or environmental condition capable of being monitored by a sensor. As shown in FIG. 1, system 100 also includes the site management platform 190 for managing the industrial process as well as the sensor network. In the example shown, site management platform 190 receives data from the network of sensors and/or sends configuration commands to the network of sensors via the sensor gateway(s) 180. Site management platform 190 is configured to store data from sensors in an "event log" database 192.

A process mining module 194 is configured to mine the event logs 192 to produce a process graph 196 that represents the industrial process. For example, the process graph 196 identifies nodes and links describing the production flow from the stage of incoming assembly elements to the stage of ready to be shipped assembled products. For instance, from the sensor measurements of the physical system elements (equipment, materials, human workers, and environmental conditions) together with the event logs (e.g., business related events and measures) of the site management platform 190, process mining module 194 can discover a process flow. A network or graph representation (i.e., the process graph) can be created with stations and tasks as nodes, and logical and temporal ordering connections as directed links. These links can be weighted by, e.g., various performance-related measures of time, cost, quality, flux, etc.

Figure 2:
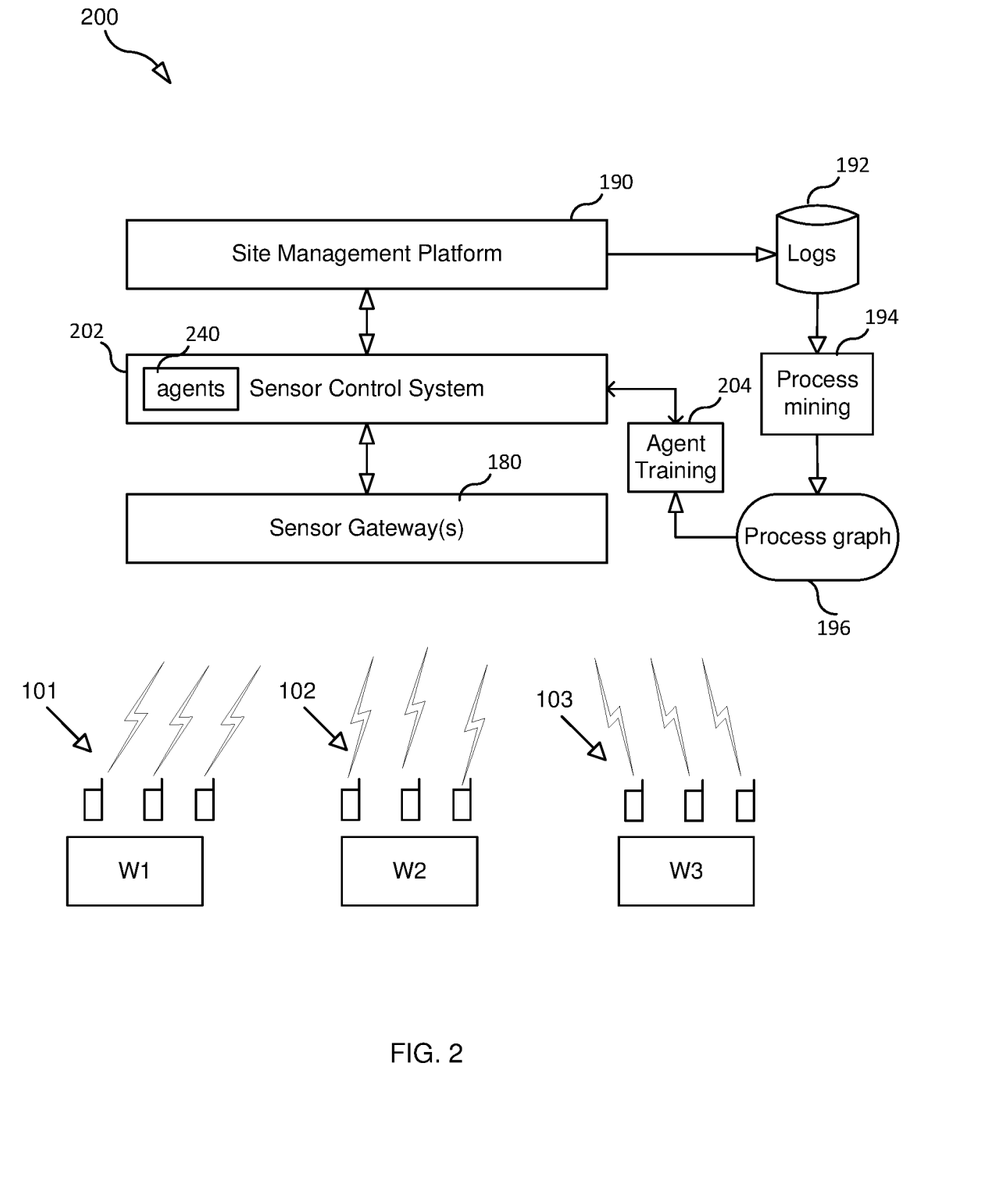
FIG. 2 illustrates a system according to an embodiment.

FIG. 2 illustrates a system 200 according to an embodiment. System 200 includes the elements of FIG. 1 plus two new elements, the sensor control system 202, which provides for an optimized configuration of the sensor network and a training agent 204. For example, as shown in FIG. 1 and FIG. 2, the sensor network may consist of many sensors, and, if all of the sensors are configured to provide reports to the site management platform 190, then the site management platform 190 and/or the sensor gateway(s) 180 may become overloaded. On the other hand, if the sensors are not configured appropriately, then important information may be lost and the performance of the industrial process may degrade. Sensor control system 202 aims to strike the right balance so that just enough information is provided to maintain the performance of the system.

Sensor control system 202 is an Artificial Intelligence (AI) system that comprises one or more agents (e.g., RL agents, discussed below) that through reinforcement learning can optimize the configuration of the sensor network, or at least a portion thereof. That is, to optimize the efficiency and handle high-level goal definition with easy prioritization, sensor control system 202 includes a set of one or more agents 240 that are trained to make automatic decisions of sensor control tasks based on sensor output (e.g., state reports). In one embodiment, sensor control system 202 is configured for optimal monitoring within constraints, e.g., to minimize the communicated data load by filtering irrelevant information and saving radio capacity by reconfiguring the sensors to only provide reports when necessary, while at the same time keeping the key performance metrics at sufficiently high level. This is increasingly significant in the scenario of hyperscale Industrial-IoT sensor networks.

Figure 3:
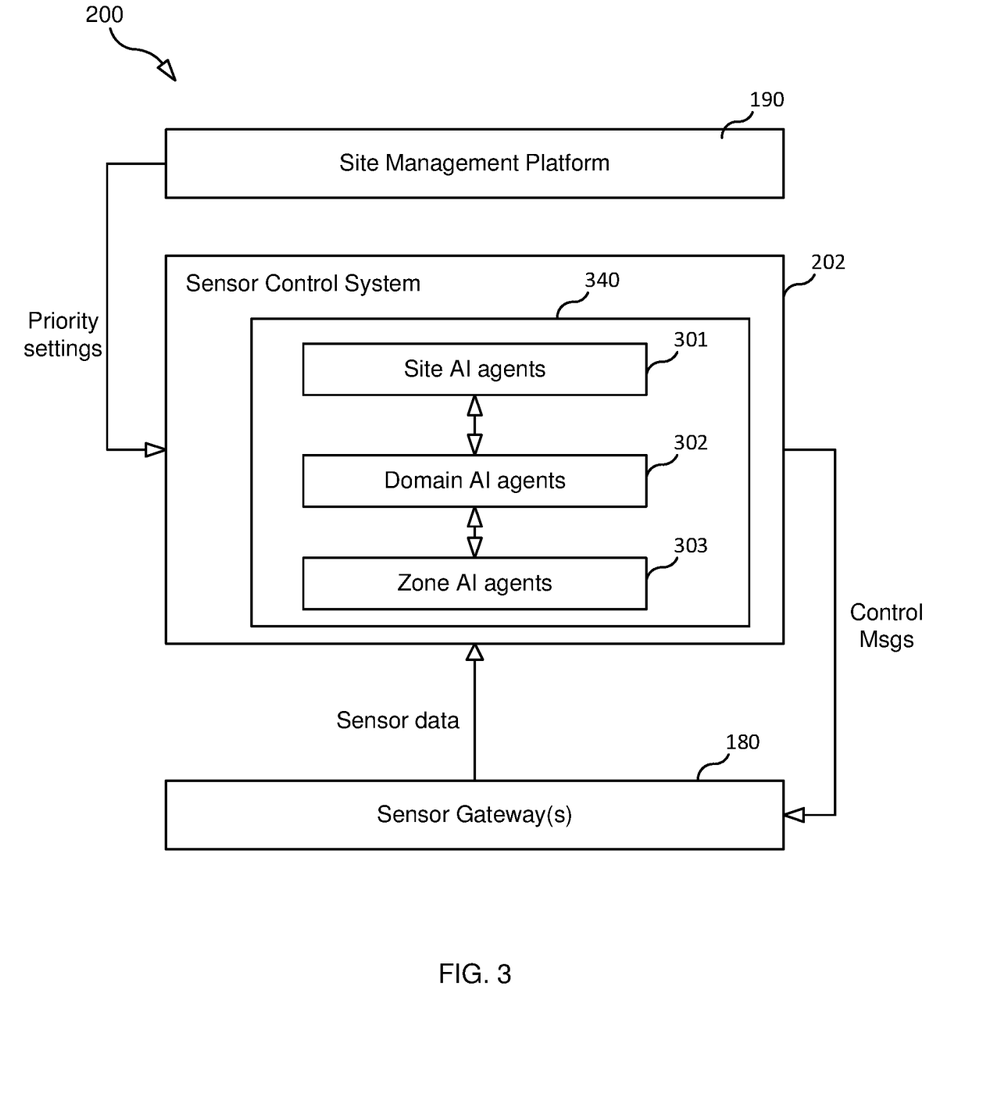
FIG. 3 illustrates a sensor control system according to an embodiment.

FIG. 3 illustrates one example embodiment of sensor control system 202. In the embodiment shown, sensor control system 202 comprises a hierarchical system of agents 340. This hierarchical system of agents 340 comprises: site agents 301, domain agents 302, and zone agents 303. The sensor control system 202 receives priority settings from the site management platform 190 and state reports via the sensor gateway(s) 180. These are the inputs for the agents, which are defined on the various levels of local zones, functional domains, and global site, which then make decisions as to when to send control messages to a sensor to trigger the sensor to send a state report. While FIG. 3 shows a three-level hierarchy, this is solely for illustration and is not limiting. That is, sensor control system 202 may have more or fewer hierarchical levels (e.g., a 1 level hierarchy is contemplated for some embodiments).

Agent Training—Reinforcement Learning

Reinforcement Learning (RL) is a rapidly evolving AI technology that enables an RL agent to initiate real-time adjustments to a system, while continuously training the RL agent using a feedback loop. The skilled person will be familiar with RL and RL agents, nevertheless the following provides a brief introduction to RL agents.

Reinforcement learning is a type of machine learning process whereby an RL agent (e.g., a programmed computer) is used to select an action to be performed based on information indicating a current state of a system (or part of the system). For example, based on current state information obtained from the system and an objective, the RL agent can initiate an action (e.g., trigger a sensor to make measurements and send a report) to be performed, which may, for example, comprise adjusting the system towards an optimal or preferred state of the system. The RL agent receives a "reward" based on whether the action changes the system in compliance with the objective (e.g., towards the preferred state), or against the objective (e.g., further away from the preferred state). The RL agent therefore adjusts parameters in the system with the goal of maximizing the rewards received.

Use of an RL agent allows decisions to be updated (e.g., through learning and updating a model associated with the RL agent) dynamically as the environment changes, based on previous decisions (or actions) performed by the RL agent. Put more formally, an RL agent receives an observation from the environment (denoted St) and selects an action (denoted At) to maximize the expected future reward. Based on the expected future rewards, a value function for each state can be calculated and an optimal policy that maximizes the long term value function can be derived. Reference [1] describes hierarchical RL for strategic goals.

Heterogeneous sensor network control using reinforcement learning can be trained by implementing a microscopic representation of the states of the physical system structure to be monitored by the sensors. This task can be implemented by an automatic process mining technique. Using process graphs, local and global representations with corresponding metrics can be created.

In embodiments of the sensor control system 202, each $i^{th}$ low-level unit (i.e., an agent, such as a domain agent 302 or a zone agent 303, that is responsible for control decisions of low level sensor units) represented by $f_i$ will contribute to its respective mid-level state and objective function $F_k$ of the $k^{th}$ agent $A_k$. The global objective function is then simply calculated by setting importance weights to each of the agent's interest and using their weighted sum as the global or final goal of the two-phase learning process: $G=\Sigma_k w_k F_k$.

In embodiments a higher level and intuitive structure of an industrial site are used to define the RL agents of sensor control system 202. Looking at such an intuitive unit, an agent can be trained to control its respective sensors to serve the local optimization function. In the last phase of the training, a predefined global weighted sum of these local objective functions is used.

For the continuous training loop of the RL agents of sensor control system 202 a digital twin of a process graph is employed with measured state information for given scenarios and for updating the model when needed. This is illustrated in FIG. 2, which shows an agent training module 204 that uses the process graph 196 to train the RL agents of sensor control system 202. In addition to using the process graph 196 to train the RL agents, the following information is also used: sensor data, communication capacity information, key performance indicators (KPIs), and information regarding the satisfaction of communication constraints.

Figure 4A:
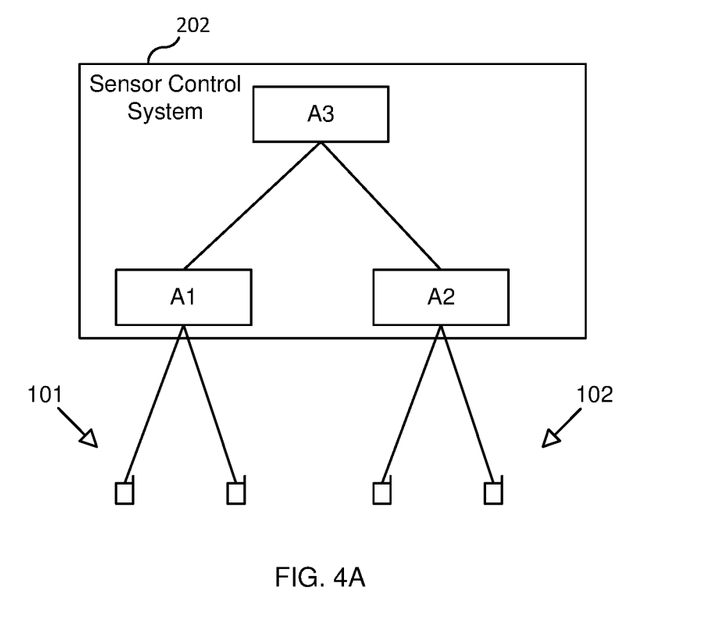
FIG. 4A illustrates a domain definition according to a location based embodiment.
Figure 4B:
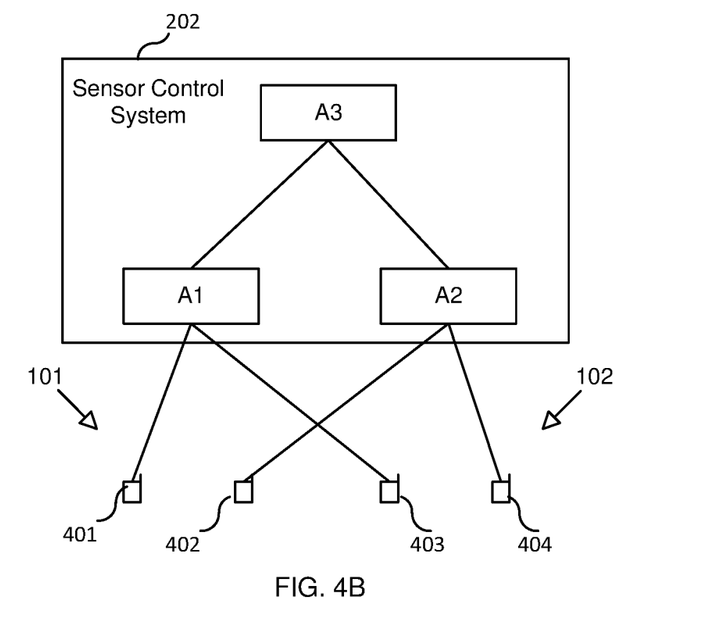
FIG. 4B illustrates a domain definition according to functional based embodiment.

FIGS. 4A and 4B present two embodiments for the domain definition of the RL agents of sensor control system 202. In this example, sensor control system 202 comprises at least three RL agents: A1, A2, and A3. FIG. 4A illustrates local domains based on sensor location. That is agent A1 is configured to receive input from sensor set 101 because the sensors in this set 101 are co-located, and agent A2 is configured to receive input from sensor set 101 because the sensors in this set 102 are co-located. On the other hand, FIG. 4B illustrates using functional similarity in sensors for the grouping without regard to local proximity. That is, functional domains are defined. In the specific example shown, agent A1 is configured to receive input from sensors 401 and 403 because these sensors perform the same or similar function, and agent A2 is configured to receive input from sensors 402 and 404 because these sensors perform the same or similar function. Depending on the underlying system structure, either the location based domains or the functionality based domains can provide easier interpretation of agent actions and shorter training of the agents.

As the above demonstrates, an agent-based RL system is applied in a sensor control system for controlling a sensor network (e.g., a hyperscale sensor system). An advantage of the embodiments is the use of definition of agents by domains and the ability to leverage process level feedback in the training of the agents. High-level goal definition for simplified prioritization by operators is ensured through hierarchical learning. Reinforcement learning is made possible by use of automatically discovered process graph representation where efficiency metrics provide feedback during continuous training loops.

Example

Figure 5:
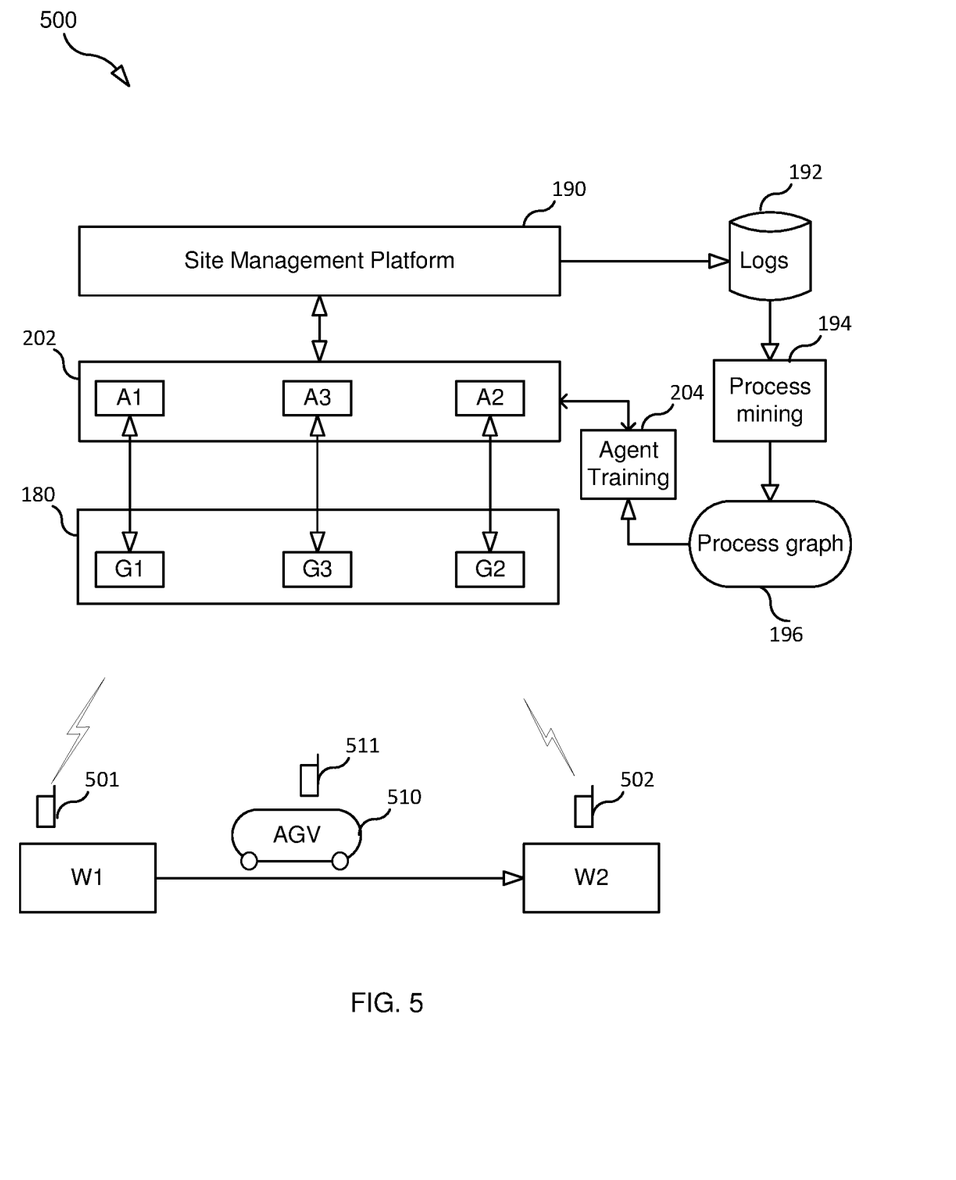
FIG. 5 illustrates an example system according to an embodiment.

FIG. 5 illustrates an example system 500, where the sensor control system 202 includes at least three RL agents: A1, A2, and A3. In system 500, two workstations (W1 and W2) that are used in a manufacturing process are equipped with a sensor. That is, W1 is equipped with sensor 501, which sends its reports to a first sensor gateway G1, and W2 is equipped with sensor 502, which sends its reports to a second sensor gateway G2. Also, there is an automated guided vehicle (AGV) 510 equipped with a sensor 511 that sends its reports to a third sensor gateway G3. While three sensor gateways are shown, this was solely done for illustration as two or more sensors may communicate with the same sensor gateway. In this example, W1 processes certain units which are then conveyed to W2 by AGV 510, and W2 is responsible for further processing the units.

In the normal state of the manufacturing processes, sensors 501 and 502 send reports, and sensor 511 is idle (i.e., not sending any reports). When a KPI (e.g., input rate) drops with respect to W2, agent A2 will learn of this event from a report transmitted by sensor 502. For example, the report may indicate that the rate of units arriving at W2 has fallen below some threshold. Using the process graph 196, agent A2 has discovered that W1 is responsible for outputting the production output units, and, hence, agent A2 has learned to co-operate with agent A3, which is receiving reports from sensor 501. Accordingly, agent A2 may seek to determine whether a KPI (e.g., unit output rate) with respect to W1 has fallen below a threshold (e.g., agent A2 may send to agent A3 a request for output rate data for W1). For example, agent A2 may seek to determine whether the rate at which W1 is outputting the units has also fallen below the threshold. If agent A2 determines that the KPI for W1 has fallen below the threshold, then agent A2 may take no action as agent A2 knows from the process graph that the problem of the reduced input rate to W2 is likely not caused by a problem with the link that connects W1 with W2. By taking no action, communication network capacity can be used by other sensors as there is no reason to activate sensor 511.

On the other hand, if agent A2 determines that the rate at which W1 is outputting the units is normal, then A2 can, based on the process graph which informs agent A2 that AGV 510 is the link connecting W1 with W2, deduce that that there may be a problem on this link (i.e., a problem with AGV 510). As a result of deducing a problem on the link between W1 and W2, agent A2 can take the action of causing agent A3 to activate sensor 511 by causing agent A3 to send to sensor 511 a configuration message. In this way, sensor 511 is activated only when needed, thereby reducing the load on the sensor gateway(s) 180. By activating sensor 511, agent A3 will receive a report from sensor 511. If this report indicates a problem with AGV 510, agent A3 can send a report to the site management platform 190, which can then take a corrective action (e.g., re-routing AGV 510).

The above scenario provides an example of cooperative strategic decision, where the problem seen at A2 is not solved by A2 sensor reconfiguration action. Even the normal state of minimal manufacturing monitoring without any outages is the result of a cooperative decision of only reporting from A2 and A1 domains, but leaving AGV's idle when possible. This was learnt by a training process during a test of series of combinations of state reports and action consequences.

Figure 6:
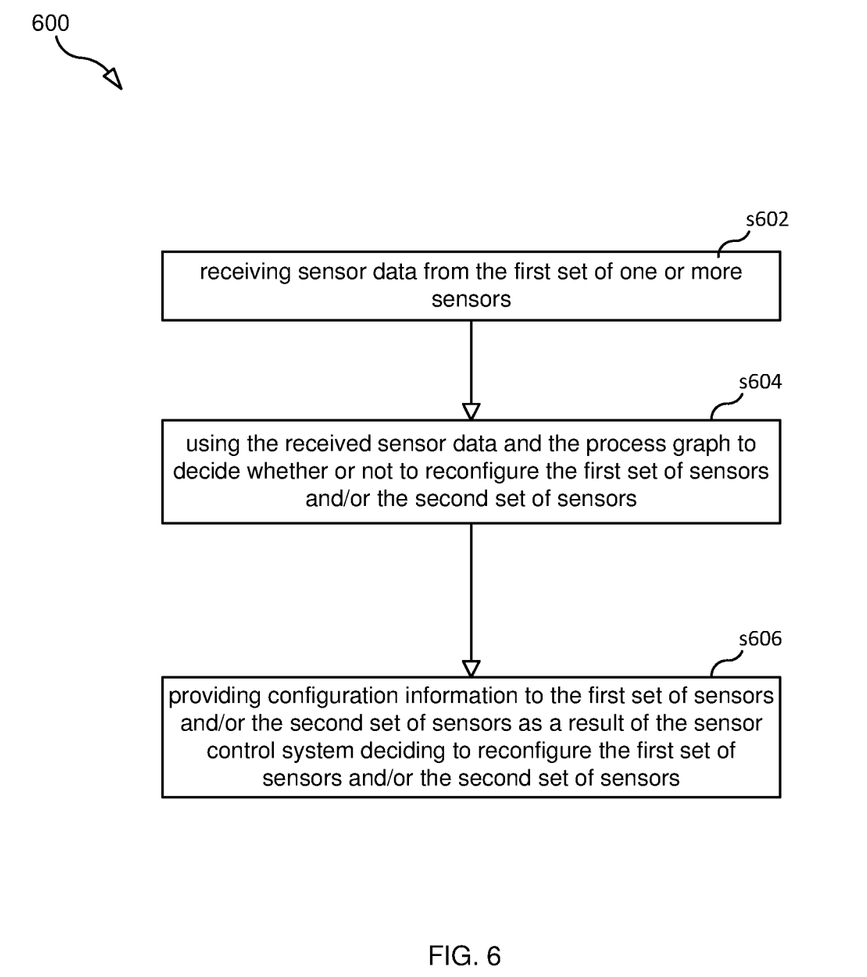
FIG. 6 is a flowchart illustrating a process according to some embodiments.

FIG. 6 is a flowchart illustrating a process 600, according to an embodiment, for controlling a sensor network. Process 600 may begin in step s602. Step s602 comprises the sensor control system 202 receiving sensor data from the first set of one or more sensors 101. Step s604 comprises the sensor control system 202 using the received sensor data and the process graph to decide whether or not to reconfigure the first set of sensors and/or the second set of sensors. Step s606 comprises the sensor control system 202 providing configuration information to the first set of sensors and/or the second set of sensors as a result of the sensor control system deciding to reconfigure the first set of sensors and/or the second set of sensors.

In some embodiments process 600 further includes the steps of: training the first RL agent using: i) the process graph 196, ii) sensor data, and iii) communication capacity information; and training the second RL agent using: i) the process graph 196, ii) the sensor data, and iii) the communication capacity information. In some embodiments, training the first and second RL agents comprises: i) performing a first training phase where the first RL agent is trained to optimize a first local optimization function and the second RL agent is trained to optimize a second local optimization function; and ii) performing a second training phase where the first and second RL agents are trained to optimize a predefined weighted sum of local objective functions.

In some embodiments, the first and second domains are defined based on sensor locations, and in other embodiments, first and second domains are defined based on functional similarities.

In some embodiments, providing the configuration information to the first set of sensors and/or the second set of sensors comprises the sensor control system 202 transmitting the configuration information to a sensor gateway that is configured to relay the configuration information to the first set of sensors and/or the second set of sensors.

In some embodiments, the first set of sensors are configured to monitor a first workstation (e.g., workstation W2 shown in FIG. 5), and the second set of sensors are configured to monitor a second workstation (e.g., the AGV shown in FIG. 5). In some embodiments, receiving sensor data from the first set of one or more sensors comprises the first RL agent receiving the sensor data from the first set of sensors, and the step of using the received sensor data and the process graph to decide whether or not to reconfigure the first set of sensors and/or the second set of sensors comprises: i) the first RL agent detecting an anomaly with respect to the first workstation based on the received sensor data; and ii) the first RL agent, as a result of detecting the anomaly with respect to the first workstation, obtaining information about a third workstation (e.g., W1 show in FIG. 5) that is monitored by a third set of sensors. In some embodiments, process 600 further comprises the first RL agent using the obtained information about the third workstation to decide whether or not to reconfigure the second set of sensors. For example, as discussed above with respect to FIG. 5, the first RL agent (agent A2 in the example of FIG. 5) decides to activate sensor 511 (i.e., the sensors monitoring AGV 510) when the first RL agent detects an anomaly with respect to the rate at which units are arriving at W2 but does not detect any anomaly with respect to the rate at which units are being output by W1.

Figure 7:
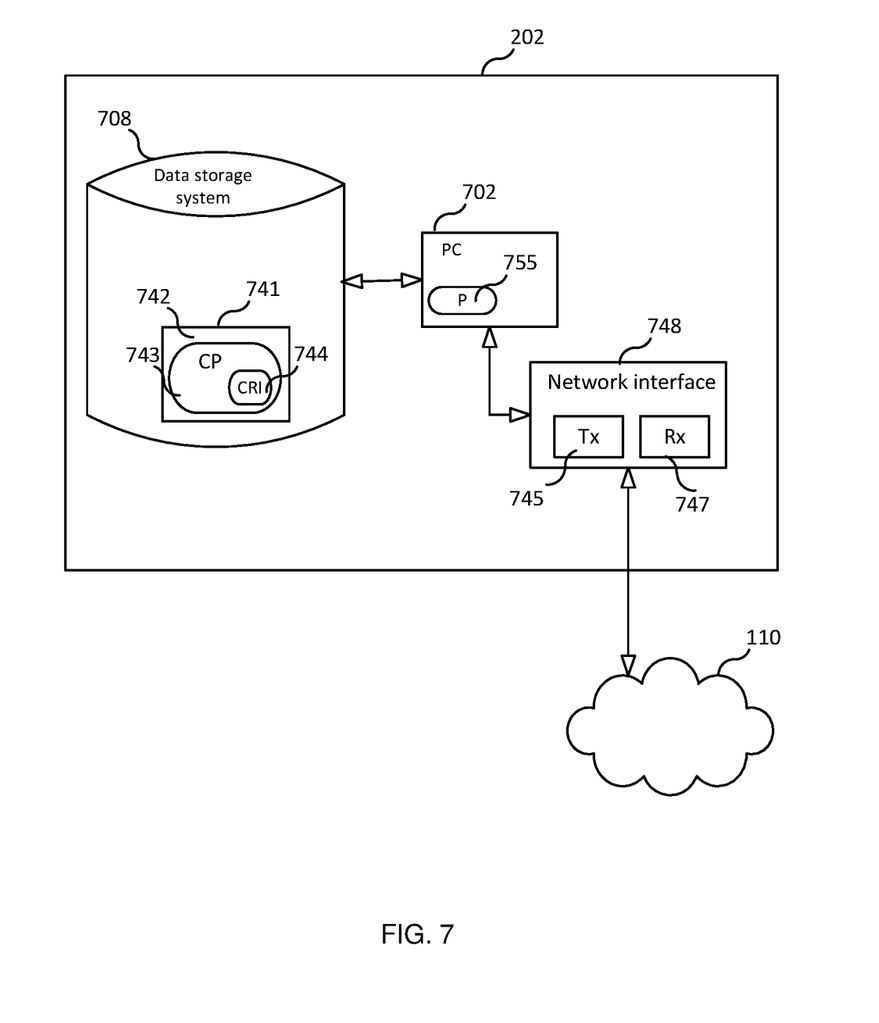
FIG. 7 illustrates a network node according to some embodiments.

FIG. 7 is a block diagram of a sensor control system 202, according to some embodiments, for performing the methods disclosed herein. As shown in FIG. 7, sensor control system 202 may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., sensor control system 202 may be a distributed computing apparatus); at least one network interface 748 comprising a transmitter (Tx) 745 and a receiver (Rx) 747 for enabling sensor control system 202 to transmit data to and receive data from other nodes connected to a network 110 (e.g., an Internet Protocol (IP) network) to which network interface 748 is connected (directly or indirectly) (e.g., network interface 748 may be wirelessly connected to the network 110, in which case network interface 748 is connected to an antenna arrangement); and a storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes sensor control system 202 to perform steps described herein (e.g., steps described herein with reference to the flow charts). In other embodiments, sensor control system 202 may be configured to perform steps described herein without the need for code. That is, for example, PC 702 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] "OpenAI Five", 2018, openai.com/five/, blog.openai.com/openai-five/.

The invention claimed is:

1. A method performed by a sensor control system for managing at least a first set of one or more sensors for monitoring a first domain of an industrial process and a second set of one or more sensors for monitoring a second domain of the industrial process, wherein the sensor control system comprises at least a first reinforcement learning (RL) agent and a second RL agent, wherein the first and second RL agents were trained using reinforcement learning and a process graph representing the industrial process, the method comprising:
the sensor control system receiving sensor data from the first set of one or more sensors;
the sensor control system using the received sensor data and the process graph to decide whether or not to reconfigure the first set of sensors and/or the second set of sensors; and
the sensor control system providing configuration information to the first set of sensors and/or the second set of sensors as a result of the sensor control system deciding to reconfigure the first set of sensors and/or the second set of sensors,
wherein the first and second domains are defined based on sensor locations; or
wherein the first and second domains are defined based on functional similarities.

2. The method of claim 1, wherein
the first set of sensors are configured to monitor a first workstation, and
the second set of sensors are configured to monitor a second workstation.

3. The method of claim 2, wherein receiving sensor data from the first set of one or more sensors comprises the first RL agent receiving the sensor data from the first set of sensors.

4. The method of claim 3, wherein using the received sensor data and the process graph to decide whether or not to reconfigure the first set of sensors and/or the second set of sensors comprises:
the first RL agent detecting an anomaly with respect to the first workstation based on the received sensor data; and
the first RL agent, as a result of detecting the anomaly with respect to the first workstation, obtaining information about a third workstation that is monitored by a third set of sensors.

5. The method of claim 4, further comprising the first RL agent using the obtained information about the third workstation to decide whether or not to reconfigure the second set of sensors.

6. The method of claim 1, further comprising:
training the first RL agent using: i) the process graph, ii) sensor data, and iii) communication capacity information; and
training the second RL agent using: i) the process graph, ii) the sensor data, and iii) the communication capacity information.

7. The method of claim 6, wherein training the first and second RL agents comprises:
performing a first training phase where the first RL agent is trained to optimize a first local optimization function and the second RL agent is trained to optimize a second local optimization function; and
performing a second training phase where the first and second RL agents are trained to optimize a predefined weighted sum of local objective functions.

8. The method of claim 1, wherein the first and second domains are defined based on sensor locations.

9. The method of claim 1, wherein the first and second domains are defined based on functional similarities.

10. The method of claim 1, wherein providing the configuration information to the first set of sensors and/or the second set of sensors comprises transmitting the configuration information to a sensor gateway that is configured to relay the configuration information to the first set of sensors and/or the second set of sensors.

11. A non-transitory computer readable storage medium storing a computer program comprising instructions which when executed by processing circuitry of a sensor control system causes the sensor control system to perform the method of claim 1.

12. A sensor control system for managing at least a first set of one or more sensors for monitoring a first domain of an industrial process and a second set of one or more sensors for monitoring a second domain of the industrial process, the sensor control system comprising:
a first reinforcement learning, (RL) agent; and
a second RL agent, wherein
the first and second RL agents were trained using reinforcement learning and a process graph representing the industrial process, and
the sensor control system is operable to:
i) receive sensor data from the first set of one or more sensors;
ii) use the received sensor data and the process graph to decide whether or not to reconfigure the first set of sensors and/or the second set of sensors; and
iii) provide configuration information to the first set of sensors and/or the second set of sensors as a result of deciding to reconfigure the first set of sensors and/or the second set of sensors.

13. A sensor control system for managing at least a first set of one or more sensors for monitoring a first domain of an industrial process and a second set of one or more sensors for monitoring a second domain of the industrial process, the sensor control system comprising:

a receiver for receiving sensor data from a first set of one or more sensors;

processing circuitry; and a memory, the memory containing instructions executable by the processing circuitry, wherein the sensor control system is configured to:

use the received sensor data and a process graph representing the industrial process to decide whether or not to reconfigure the first set of sensors and/or a second set of sensors; and     provide configuration information to the first set of sensors and/or the second set of sensors as a result of the sensor control system deciding to reconfigure the first set of sensors and/or the second set of sensors,     wherein the first and second domains are defined based on sensor locations; or     wherein the first and second domains are defined based on functional similarities.

14. The sensor control system claim 13, further comprising:

training a first reinforcement learning (RL) agent using: i) the process graph, ii) sensor data, and iii) communication capacity information; and     training a second RL agent using: i) the process graph, ii) the sensor data, and iii) the communication capacity information.

15. The sensor control system claim 14, wherein training the first and second RL agents comprises:

performing a first training phase where the first RL agent is trained to optimize a first local optimization function and the second RL agent is trained to optimize a second local optimization function; and     performing a second training phase where the first and second RL agents are trained to optimize a predefined weighted sum of local objective functions.

16. The sensor control system claim 14, wherein the first set of sensors are configured to monitor a first workstation, the second set of sensors are configured to monitor a second workstation, receiving sensor data from the first set of one or more sensors comprises the first RL agent receiving the sensor data from the first set of sensors, using the received sensor data and the process graph to decide whether or not to reconfigure the first set of sensors and/or the second set of sensors comprises:

the first RL agent detecting an anomaly with respect to the first workstation based on the received sensor data; and     the first RL agent, as a result of detecting the anomaly with respect to the first workstation, obtaining information about a third workstation that is monitored by a third set of sensors, and the first RL agent is configured to use the obtained information about the third workstation to decide whether or not to reconfigure the second set of sensors.

17. The sensor control system claim 13, wherein the first and second domains are defined based on sensor locations.

18. The sensor control system claim 13, wherein the first and second domains are defined based on functional similarities.

19. The sensor control system claim 13, wherein providing the configuration information to the first set of sensors and/or the second set of sensors comprises transmitting the configuration information to a sensor gateway that is configured to relay the configuration information to the first set of sensors and/or the second set of sensors.

\* \* \* \* \*